Dec. 24, 1929.                  F. HAMILTON                 1,740,588
                             ILLUMINATING MEANS
                            Filed Nov. 23, 1925           2 Sheets-Sheet 1
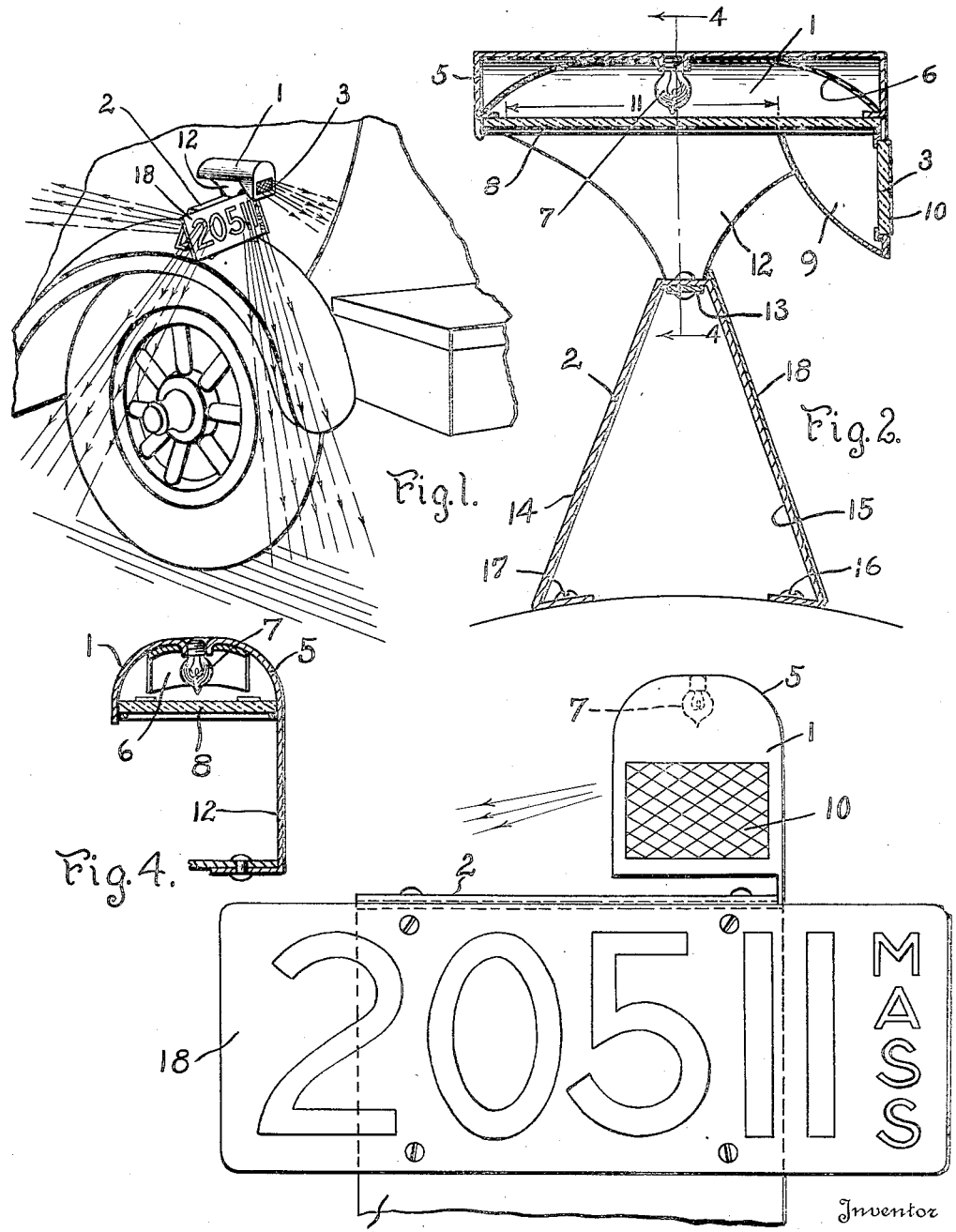
Frederick Hamilton, Inventor
By Harry H. Styll, Attorney Dec. 24, 1929.  F. HAMILTON  1,740,588
ILLUMINATING MEANS
Filed Nov. 23, 1925  2 Sheets-Sheet 2

Inventor
Frederick Hamilton.
By Harry H. Styll
Attorney

Patented Dec. 24, 1929

1,740,588

UNITED STATES PATENT OFFICE

FREDERICK HAMILTON, OF PROVIDENCE, RHODE ISLAND

ILLUMINATING MEANS

Application filed November 23, 1925. Serial No. 70,840.

This invention relates to illuminating means and particularly to illuminating means for the rear lights of automobiles.

The principal object of the invention is to provide reflecting means and luminous spots on moving objects, such as automobiles that can be seen but will not dazzle the observer.

Another object of the invention is to provide in a single device means for fulfilling several illuminating requirements from one source of light.

Other objects of the invention are to provide, by indirect lighting, the source of which is hidden, a non-glare reflector that can be seen from the front, a non-glare reflector that can be seen from the side, an illumination of the number plates, an illumination of the tail light, a right and left turn signal visible from front and rear, a side and rear illumination of the road for use in backing at night or in dark places, and simple, economic and compact structures to perform these functions.

Prior to my invention vehicles have had only colored tail and glow lights at the rear. These lights cannot be seen from the front or side and are of little use in illuminating the road at the rear of the vehicle. It has been found from experience that many times a vehicle with only one headlight is met on the road. One cannot tell whether it is the right or the left light, and cannot gauge his margin of safety in passing. There has been nothing provided on the vehicle for others to aim at with certainty. Again, there is always a black or dark space at the side of an approaching vehicle in the night that is blind, hence there is great danger of striking a person or obstacle in the blind zone. These objections and dangers are avoided by the use of my invention, which gives all necessary illumination of the car and the road both to the driver of the car to which it is attached, as well as to the approaching driver. All of these advantages are obtained by simple, compact, easily attached and durable structures, with a minimum expenditure of radiant energy.

Other objects and advantages of the invention will become apparent from the drawings and the following description in which only the preferred forms have been given by way of illustration. It will be apparent that many changes in the structure and arrangements may be made without departing from the spirit of the invention, as expressed in the claims; hence I do not desire to be limited only to the devices shown and described.

Referring to the drawings in which similar characters refer to similar parts throughout:

Figure 1 is a sectional perspective view showing the invention attached to the rear mud guard of an automobile.

Figure 2 is a side elevation in cross section.

Figure 3 is a rear elevation.

Figure 4 is a cross section on line 4—4 of Figure 2.

Figure 5:
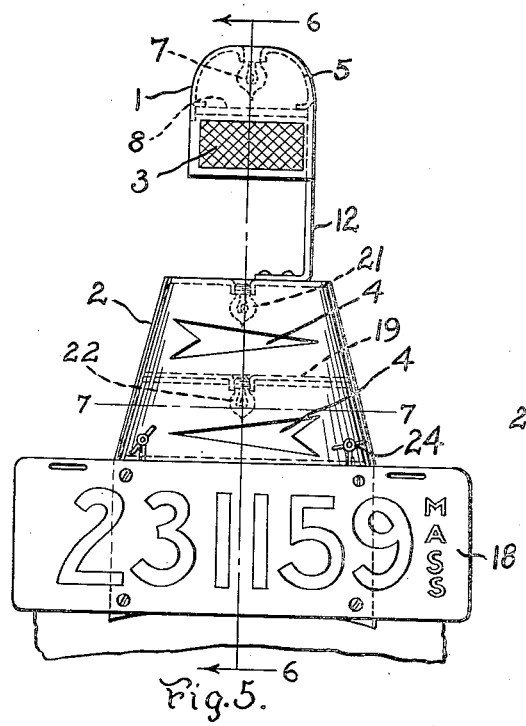
Figure 5 is a rear elevation of a modified form showing right and left turn signals.

The invention primarily is comprised of a reflector chamber 1 and a non-glare reflector casing or section 2, and secondarily of a tail lamp 3 and a right and left turn signal 4.

The reflector chamber or hood comprises a housing 5 having a curved reflector 6, a lamp 7, and a glass bottom 8. This glass bottom may be clear white glass or it may be frosted to give diffused light. At one end of the light chamber or hood is a second or tail light chamber 9 having a colored glass window or lens 10. All the sides of the chamber 9 are closed except the top where light enters the chamber through the glass bottom 8. In practise I make the glass bottom 8 frosted for the distance 11 indicated by the arrows in Figure 2, and the portion over the chamber 9 of clear glass. The light from the reflector 6 shines through the glass bottom 8 into the chamber 9 and out through the lens 10, thus giving tail light illumination visible from the rear.

The reflector chamber is supported by a bracket plate 12 secured to the non-glare reflector section at 13. The face of the bracket 12 is preferably enameled in white or covered with white celluloid to glow but not glare in the light from the reflector 6. This enameled face forms a reflector and spot light which can be seen from the side of the car by vehicles approaching from a side road. It also reflects light out onto the road at the side and helps illuminate the blind zone for passing vehicles. The side road is also illuminated by rays direct from the reflector 6 passing out through the bottom 8.

The non-glare reflector section 2 comprises an easel like bracket having the legs 14 and 15, bolted at 16 and 17 to the mud guard of the automobile. The front face 14 is enameled in white or covered with white celluloid similar to the face of the bracket 12, and the light rays from the lamp reflector 6 strike this face 14 and are reflected directly ahead so the face 14 is a spot light to approaching vehicles as the white face will glow but not glare in the light. The number plate 18 is secured to the face 15 and the light from the reflector 6 illuminates this plate so the numbers may be read from the rear.

Figure 6:
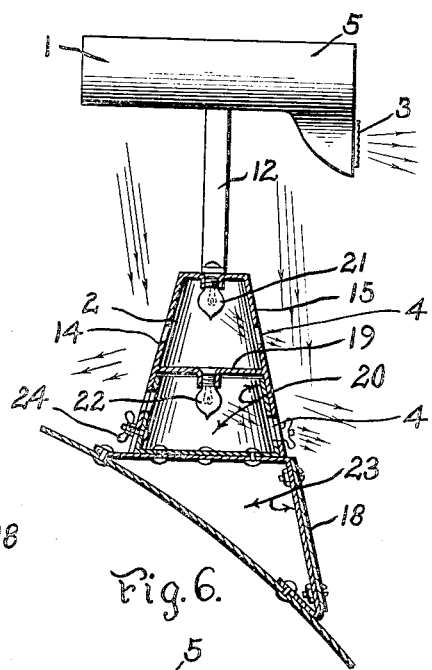
Figure 6 is a side elevation of Figure 5 partly in cross section on line 6—6 of Figure 5.
Figure 8:
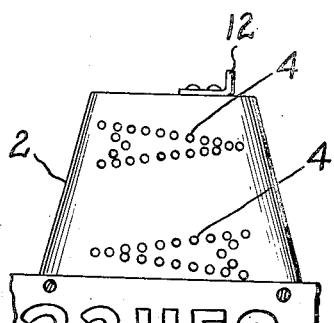
Figure 8 is a partial elevation showing a modified form of right and left turn signals of Figure 5.

In Figures 5 and 6 is shown a modification in which the non-glare reflector 2 has been pierced on the front and rear sides with the right and left pointed orifices 4 shown as cut away in Figure 5 and as perforated in Figure 8. In this form the non-glare reflector section has been divided by the diaphragm 19 supported by the bracket 20. The upper chamber is lighted by a lamp 21 and the lower by a lamp 22. These two lamps are connected with the instrument board and can be turned on or off by the driver from the driver's seat. In this form the faces 14 and 15 are covered by a white translucent celluloid or other covering through which the light from the lamps 21 and 22 may show, and the openings 4 may be covered with a colored glass. The faces 14 and 15, being covered with the white celluloid, act as spot lights being illuminated from the reflector 6, one in front, the other in the rear. In this modification the number plate 18 is secured below the non-glare reflector 2.

Figure 7:
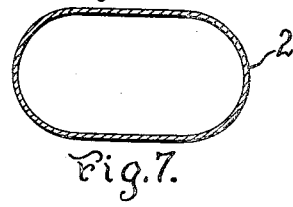
Figure 7 is a cross section on line 7—7, Figure 5.

As shown in Figure 7, the non-glare reflector is in the form of a truncated ellipsoid, all vertical faces of which are reflector and spot light surfaces, front, sides, and rear. It is supported on the mud guard by the bracket 23, to which is secured the bracket 20. The non-glare reflector 2 slips over the bracket 20 and is secured to the bracket by the nuts 24 or other securing devices. It is easily removed. The number plate in this modification is also illuminated by the reflector 6.

Figure 9:
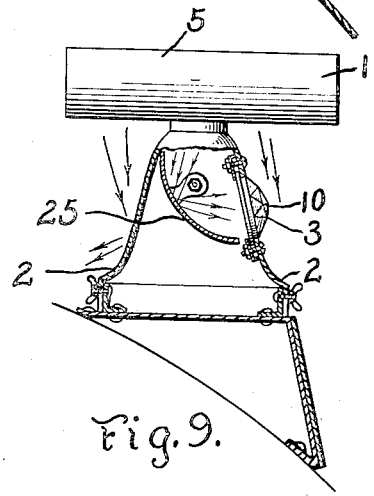
Figure 9 is a partial cross section of a modified form similar to Figure 6.

In Figure 9 I make use of a non-glare reflector 2 of a taper shape having either a circular, square or other shaped base, the outer vertical faces of which act as reflector and spot light surfaces, being covered with enamel or celluloid or other good non-glare illuminating surface. It is secured to the mud guard in a manner similar to Figure 6 and has on its rear side the lens 10 and on the inside the reflector 25. The body is hollow, the light entering from the top from the reflector 6, as in the other modification. The light on this non-glare reflector will show from front and sides, and the tail light will show on the rear.

From the foregoing description of the structure and operation it will be seen that I have provided simple, inexpensive means to carry out the objects and functions of the invention, operating from one source of light to illuminate the non-glare reflector and spot light by indirect lighting that will glow but not dazzle as the lamp reflector is not visible. The right and left turn signals may be used also for parking lights as they are visible from both front and rear. This one device makes provision for all the contingencies of night driving.

Having thus described my invention, I claim:

1. In a vehicle light, a lamp, a hood over the lamp having one side through which the light may shine and a non-glare reflector located in the path of the light from the hood having an exposed outside reflecting portion that will reflect light ahead so the illuminated outside of the reflector may be seen from the front of the vehicle and an exposed outside reflecting portion that will reflect light from the hood laterally into the road to light the dark space at the side of the vehicle.

2. In a vehicle light, a lamp, a hood over the lamp having one side through which the light may shine, a non-glare reflector located in the path of the light from the hood having a reflecting portion that will reflect light from the hood laterally into the road to light the dark space at the side of the vehicle, and means for attaching a license plate to the reflector in the path of the light from the hood whereby the license plate will be illuminated.

3. In a vehicle light, a lamp, a hood over the lamp having one side through which the light may shine, a non-glare reflector casing located in the path of the light from the hood having a reflecting portion that will reflect light from the hood laterally into the road to light the dark space at the side of the vehicle, an illuminatable signal in the rear side of the reflector casing, and a lamp in the casing to illuminate the signal.

4. In a vehicle light, a lamp, a hood over the lamp having one side through which the light may shine, a non-glare reflector located in the path of the light from the hood having a reflecting portion that will reflect light from the hood laterally into the road to light the dark space at the side of the vehicle, and an illuminatable signal in the rear side of the hood illuminated by the lamp in the hood.

5. In a vehicle light, a lamp, a hood over the lamp having one side through which the light may shine, a non-glare reflector casing in the path of the light from the hood having a reflecting surface that will reflect light from the hood laterally into the road to light the dark space at the side of the vehicle, an illuminatable signal in the rear side of the reflector casing, a lamp within the reflector casing to illuminate the signal, and an illuminatable signal in the rear side of the hood illuminated by the lamp in the hood.

6. In a vehicle light, a lamp, a hood over the lamp having one side through which the light may shine, a non-glare reflector in the path of the light from the hood having an exposed outside reflecting portion that will reflect light from the hood laterally into the road to light the dark space at the side of the vehicle, and an exposed outside reflecting portion that will reflect light from the hood to the rear to light the space behind the vehicle and the outside of which when illuminated from the hood may be seen from positions in the rear of the vehicle.

7. In a vehicle light, a lamp, a hood over the lamp having one side through which the light may shine, a non-glare reflector in the path of the light from the hood having an exposed outside reflecting portion that will reflect light from the hood ahead and may be seen from the front of the vehicle when illuminated from the hood, and an exposed outside reflecting portion that will reflect light from the hood laterally into the road to light the dark space at the side of the vehicle and having also an exposed outside reflecting portion that will reflect light from the hood into the road in the rear of the vehicle and the outside of which may be seen from the rear of the vehicle when illuminated from the hood.

8. In a vehicle light, a lamp, a hood over the lamp having one side through which the light may shine, a non-glare reflector casing in the path of the light from the hood having a reflecting portion that will reflect light from the hood ahead and may be seen when illuminated from the hood from the front of the vehicle, and a reflecting portion that will reflect light from the hood laterally into the road to light the dark space at the side of the vehicle and having also a reflecting portion that will reflect light from the hood into the road at the rear of the vehicle and can be seen when illuminated from the hood from the rear of the vehicle, an illuminatable signal on the rear side of the reflector casing, a lamp in the reflector casing to illuminate the signal, and an illuminatable signal in the rear side of the hood illuminated by the lamp in the hood 9. In a device of the character described, a non-glare reflector casing having an opening therethrough shaped to form a signal indication, a reflecting transparent outer covering over the reflector casing and over the opening therethrough, a lamp within the reflector adapted to transmit light through the opening in the casing and through the transparent outer face of the reflector over the opening to make luminous the signal indication, and a second lamp outside of the reflector for illuminating the face of the reflector.

10. In a device of the character described, a non-glare reflector casing having reflecting front and rear outer surfaces with an illuminatable signal in one of the outer surfaces, a lamp within the casing adapted to illuminate the signal, and a second lamp outside of the reflector casing adapted to illuminate the front and rear faces of the reflector casing.

11. In a vehicle light, a support, an opaque hood carried by the support and having an opening on one side, a lamp within the hood, an illuminating member shaped to have illuminatable sides facing ahead, to the side and to the rear supported in line with the opening in the hood whereby the light from the hood will illuminate the illuminating member so that it may be seen from the front, side and rear.

12. In a vehicle light, a support, an opaque hood carried by the support and having an opening on one side, a lamp within the hood, an illuminating member supported in line with the opening in the hood and shaped to have a plurality of illuminatable sides including the front, side and rear, whereby the light from the hood will illuminate an illuminating side so that it may be seen from the front.

13. In a vehicle light, a support, an opaque hood carried by the support and having an opening on one side, a lamp within the hood, an illuminating member supported in line with the opening in the hood and shaped to have a plurality of illuminatable sides including the front, side and rear, whereby the light from the hood will illuminate an illuminatable face so that it may be seen from the side.

14. In a vehicle light, a support, an opaque hood carried by the support and having an opening on one side, a lamp within the hood, an illuminating member supported in line with the opening in the hood and shaped to have a plurality of illuminatable faces including the front, side and rear, whereby the light from the hood will illuminate an illuminatable face so that it may be seen from the rear.

15. In a vehicle light, a plurality of reflectors forming a support for an opaque hood, and illuminating means in the hood adapted to illuminate the reflector so that they may be seen from the front, side and rear.

16. In a vehicle light, a plurality of reflectors forming a support for an opaque hood, and illuminating means in the opaque hood for illuminating one of said faces so that it may be seen from the front.

17. In a vehicle light, a plurality of reflectors forming a support for an opaque hood, and illumianting means in the opaque hood for illuminating one of said faces so that it may be seen from the side.

18. In a vehicle light, a plurality of reflectors forming a support for an opaque hood, and illuminating means in the opaque hood for illuminating one of said faces so that it may be seen from the rear.

FREDERICK HAMILTON.